United States Patent

Vieiro

[11] 4,087,739
[45] May 2, 1978

[54] EARTH FORMATION PERMEABILITY DETERMINING TECHNIQUE USING SYNTHETIC RESISTIVITY PARAMETERS

[75] Inventor: Julio Vieiro, Caracas, Venezuela

[73] Assignee: Schlumberger Technology Corporation, New York, N.Y.

[21] Appl. No.: 490,377

[22] Filed: Jul. 22, 1974

[51] Int. Cl.$^2$ .............................................. G01V 3/18
[52] U.S. Cl. ................................................ 324/10
[58] Field of Search ..................................... 324/1, 10

[56] References Cited

U.S. PATENT DOCUMENTS

| | | | |
|---|---|---|---|
| 3,075,142 | 1/1963 | Albright et al. | 324/1 |
| 3,579,098 | 5/1971 | Mougne | 324/10 |
| 3,660,755 | 5/1972 | Janssen | 324/10 |
| 3,760,260 | 9/1973 | Schuster | 324/10 |
| 3,882,376 | 5/1975 | Schuster | 324/10 |

*Primary Examiner*—Gerard R. Strecker
*Attorney, Agent, or Firm*—Amster & Rothstein

[57] ABSTRACT

A pad mounted well logging measuring device provides a determination of permeable and impermeable zones in a subsurface earth formation.

2 Claims, 4 Drawing Figures

EARTH FORMATION PERMEABILITY DETERMINING TECHNIQUE USING SYNTHETIC RESISTIVITY PARAMETERS

This invention relates to the well logging methods and apparatus for investigating subsurface earth formations traversed by a borehole and more particularly to methods and apparatus using pad mounted electrode systems for determining the presence of mud cake in a zone of the borehole.

When drilling a well, it is customary to use drilling mud containing fine, solid particles in suspension. As the hydrostatic pressure of the mud column is generally higher than that of the internal pressure of the formations, the fluid portion of mud has a tendency to penetrate into permeable formations adjacent the borehole leaving a mud cake formed along the borehole wall. The fluid which penetrates into the permeable layers also drive out, at least partially, the fluid internally contained in the formations. On the other hand, there is practically no mud cake on the borehole wall opposite impermeable subsur earth formations since the mud fluid cannot penetrate into the impermeable formation. Knowledge of the presence or absence of mud cake permits a differentiation to be made between permeable and impermeable layers in the formation. Since hydrocarbons are generally found in permeable zones in the formation, the presence or absence of mudcakes provides an indication of the locations of hydrocarbons below the surface of the earth.

One well logging tool which has been developed to provide an indication of mudcake is the microlog. With this apparatus, a pad mounted electrode is lowered into a borehole. The pad mounted electrode system emits one current into the formation and two voltages are measured at different distances from the center of the electrode structure. The two measurements provide an indication of the resistivity of the formation near the borehole, (shallow resistivity), and at a distance further away from the borehole (deep resistivity) that is, measurements of resistivity of two zones in the formation at different distances from the borehole wall. By comparing the resistivity vaues, an indication of the presence or absence of mud cake in the formation can be obtained. In interpreting the results obtained from the microlog, if the deep resistivity reading is found to be greater than the shallow resistivity reading, this would be an indication that mud cake was present and that the formation was permeable while if the deep resistivity reading were less than the shallow resistivity reading, this would be an indication of the absence of mud cake and an indication that the formation was impermeable. While low resistivity readings of either the deep or shallow resistivity could prove to be ambiguous, experience had shown that when these low resistivity readings were present, that the formation zone was impermeable shale.

More recently, pad mounted electrode tools have been developed which provide a greater accuracy in obtaining the deep and shallow resistivity. This new type of well logging tool referred to as the spherical focusing apparatus is described in detail in U.S. Pat. No. 3,760,260 issued on Sept. 18, 1973 to Nick A. Schuster and assigned to the same assignee as the instant application. In this system, current electrodes associated with alternating current generators emit a main current, $I_0$, and an auxiliary current, $I_1$, from a central electrode. One of the current generators is controlled in accordance with the potential difference measured at a location in the borehole with the result that the auxiliary current forces the main current to penetrate into the formation. Voltages and currents are monitored by appropriate electronic circuitry, to provide values of the deep and shallow resistivity.

It was found, however, that despite the fact that more accurate resistivity values could be obtained with this spherically focused pad mounted tool, that tool response in the presence of mud cake did not provide an accurate indicator of the presence of mud cake on the borehole wall. While it was known that in the presence of mud cake the shallow resistivity would be much greater than the deep resistivity reading and in the absence of mud cake the shallow resistivity would be approximately seven times the deep resistivity reading, it was difficult to distinguish between the presence of mud cake on the borehole wall and the presence of shale in the formation.

There have been previous attempts to utilize a pad mounted spherically focused electrode tool to obtain information regarding the mud cake on the borehole wall. These two co-pending applications, Ser. Nos. 324,906 and 324,907, both filed Jan. 19, 1973, now abandoned, in the names of Suau and Attali et al, respectively, each present a method and apparatus for obtaining the information concerning the mudcake thickness. However, while these disclosed methods and apparatus do provide accurate results, they do still suffer from the problem of the difficulty in distinguishing between mudcake and shale.

In accordance with the invention, a pad mounted electrode tool is utilized to provide a mudcake detection method and apparatus which can accurately determine the presence of mudcake and distinguish between mudcake and shale formations. This is accomplished, by combining the measurements obtained from the pad mounted tool in a new and different manner to provide the results derived. In particular, the main and auxiliary currents are detected and two parameters are produced. The first parameter is related solely to the auxiliary current while the second parameter is related to both the main and auxiliary currents. These parameters then provide an indication of the presence or absence of mudcake and hence the location of permeable zones in the formation.

These and other features and objects of the invention become apparent to those skilled in the art when considered with the following detailed description of one embodiment of the invention taken in conjunction with the accompanying drawings wherein.

Figure 1:
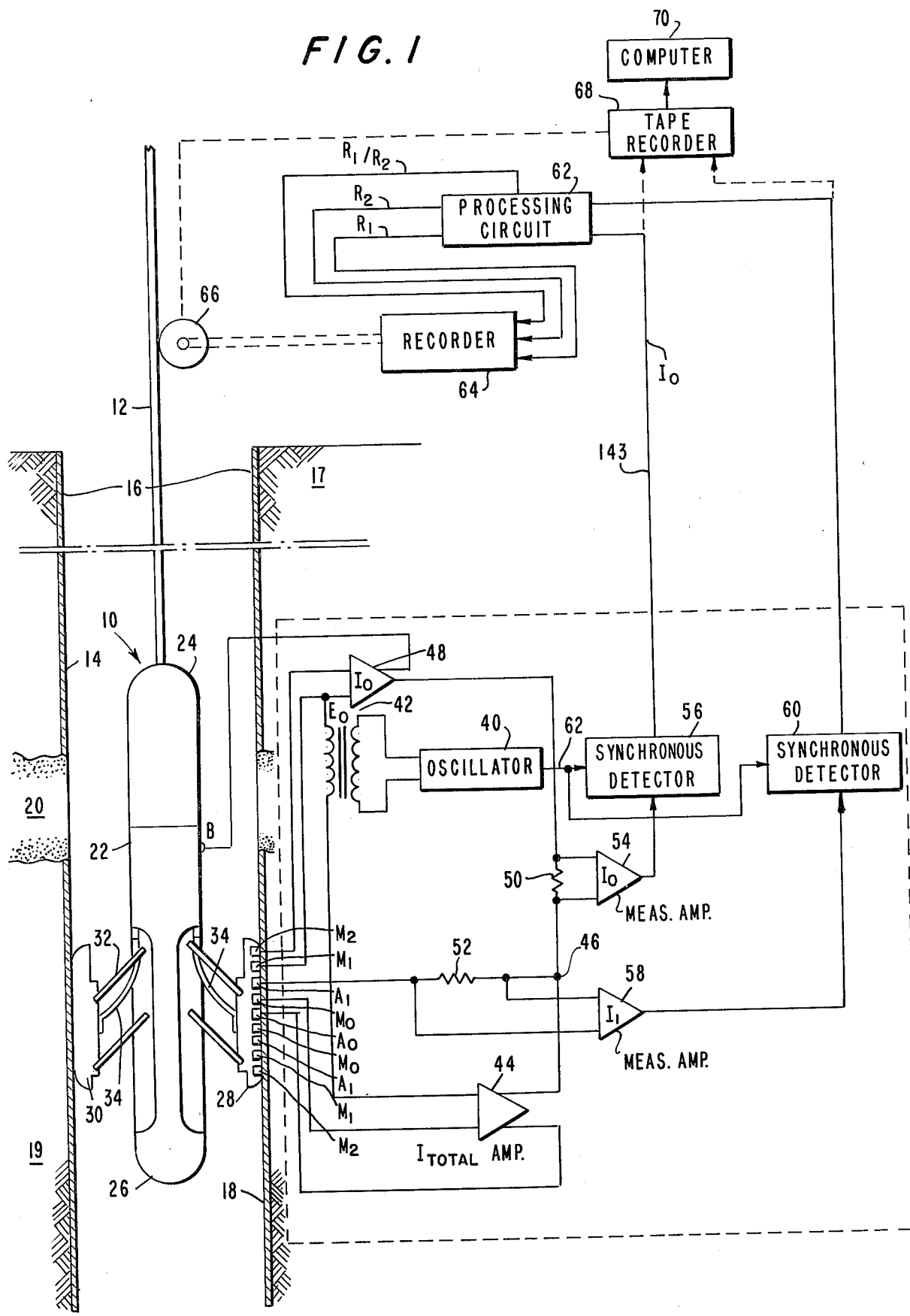
FIG. 1 is a diagrammatic and schematic representation of a pad mounted well logging tool suspended in a borehole and the associated circuitry for providing the two resistivity measurements of the invention.

Referring now to FIG. 1, there is shown a pad mounted resistivity measuring device of the spherical focusing type, which, in accordance with the invention, is useful in determination of two resistivity measurements which can be used to distinguish between permeable and impermeable formations.

The device 10 is represented as suspended at the end of cable 12 in borehole 14. Mudcake 16, 18 has been formed on the walls of permeable formations 17, 19 during drilling and is not formed on the borehole wall at impermeable formation 20. The apparatus 10 can be moved within the borehole in a conventional manner by reeling or unreeling the cable by means of a winch (not shown) located at the surface. The device comprises a body member 22 whose upper part 24 contains electric circuits which will be described and whose lower part 26 contains pads 28 and 30 articulated on the body member by means of arms 32. The pads 28 and 30 are adapted to be applied against the wall of the borehole for example by action of springs 34. These pads may generally be retracted along a body member by the action of a conventional hydraulic system (not shown) located in the upper part of the body member. The apparatus shown schematically in FIG. 1 can be constructed according to the technique described in U.S. patent application Ser. No. 52,869, filed on July 7, 1970 by Planche.

Pads 28 and 30 are measuring pads equipped with current-emitting or current-return electrodes and potential electrodes. Only the electrodes of pad 28 are shown for simplicity and clarity. The first electrode, $A_o$, is placed substantially at the center of the pad with four other electrodes $M_o$, $A_1$, $M_1$, and $M_2$, symmetrically surrounding the central electrode $A_o$ at respective increasing distances from the central electrode. These electrodes can, in particular have a rectangular form such as shown and described in the above-referenced Schuster Patent. The body member 22 comprises a current return electrode B.

These electrodes are connected to electric circuits contained in the upper part 24 of body member 22 which is shown for greater clarity in the right-hand part of FIG. 1. These circuits include oscillator 40 which provides a constant output voltage, $E_o$ across the primary of transformer 42. One terminal of the secondary of transformer 42 is connected to electrode $M_1$, the other terminal to an input of a high gain differential amplifier 44. The other input to amplifier 44 is connected to the electrode $M_o$. One output of this amplifier is connected to the electrode $A_o$ and the other output to a junction point 46 and one terminal of resistor 50 of low resistance. The electrodes $M_1$ and $M_2$ are connected to the input of a high gain differential amplifier 48 whose outputs are connected respectively to the electrode B consisting of body member 22 and the other terminal of resistor 50. Electrode $A_1$ is also connected to resistor 52 of low resistance. The ends of resistor 50 are connected to the inputs of an amplifier 54 whose output is applied to a synchronous detector 56. The ends of resistor 52 are connected to the inputs of amplifier 58 whose output is applied to synchronous detector 60. The reference signal for detectors 56 and 60 comes from oscillator 40 via conductor 62.

In operation, a main current $I_o$ and an auxiliary current $I_1$ are emitted from electrode $A_o$ into the media surrounding the electrodes system. The media may include the mudcake on the borehole wall as in borehole section 16 or only the formation, as in borehole section 20. A first control loop including high gain amplifier 48 maintains a zero potential difference between electrodes $M_1$ and $M_2$ and a second control loop comprising amplifier 44 maintains a constant potential difference, $E_o$ between the electrode $M_o$ and the electrode $M_1$. It will be noted that in a circuit shown in FIG. 1, the amplifier 44 delivers a total current ($I_1 + I_o$) while amplifier 48 delivers the current $I_o$ although the latter is connected between electrodes $A_1$ and B. The potential distribution set up in the borehole causes auxiliary current $I_1$ to flow primarily near the surface of the borehole and particularly to flow in the mudcake if any is present and forces the main current to flow in the formation at a greater distance from the borehole wall.

Amplifier 54 delivers an ac signal representative of the main current $I_o$ which is rectified in a synchronous detector 56. As the voltage between the electrodes $M_o$ and $M_1$ is kept constant and equal to $E_o$, the DC voltage appearing at the output of detector 56 is proportional to the ratio $E_o/I_o$; i.e., representative of the conductivity of the formation traversed by the main current $I_o$.

Measurements amplifier 58 whose input is connected across resistor 52 provides an output signal representative of the auxiliary current $I_1$. This signal is applied to synchronous detector 60 and the DC voltage appearing at the output of detector 60 is proportional to the ratio $E_o/I_1$; i.e., representative of the conductivity of the formation traversed by $I_1$. The two output signals are transmitted to the surface of the earth and applied to processing circuit 62 which produces two output measurements, $R_1$ and $R_2$, representative of two measurements of the resistivity of the formation. These resistivity measurements are then recorded on recorder 64 as a function of depth, controlled by wheel 66 which rotates as the tool is raised in the borehole.

Alternatively, the signals from the synchronous detectors can be applied to tape recorder 62 also driven as a function of depth and then processed in an appropriately programmed general purpose computer to provide the desired resistivity measurements at each depth level. For more detail on the operation of the spherically focused pad mounted electrode system such as described herein, reference is made to U.S. Pat. No. 3,760,260 issued to Nick A. Schuster on Sept. 18, 1973 which provides a detailed description of the operation of this type of well logging tool and which is expressly incorporated herein by reference.

Figure 2:
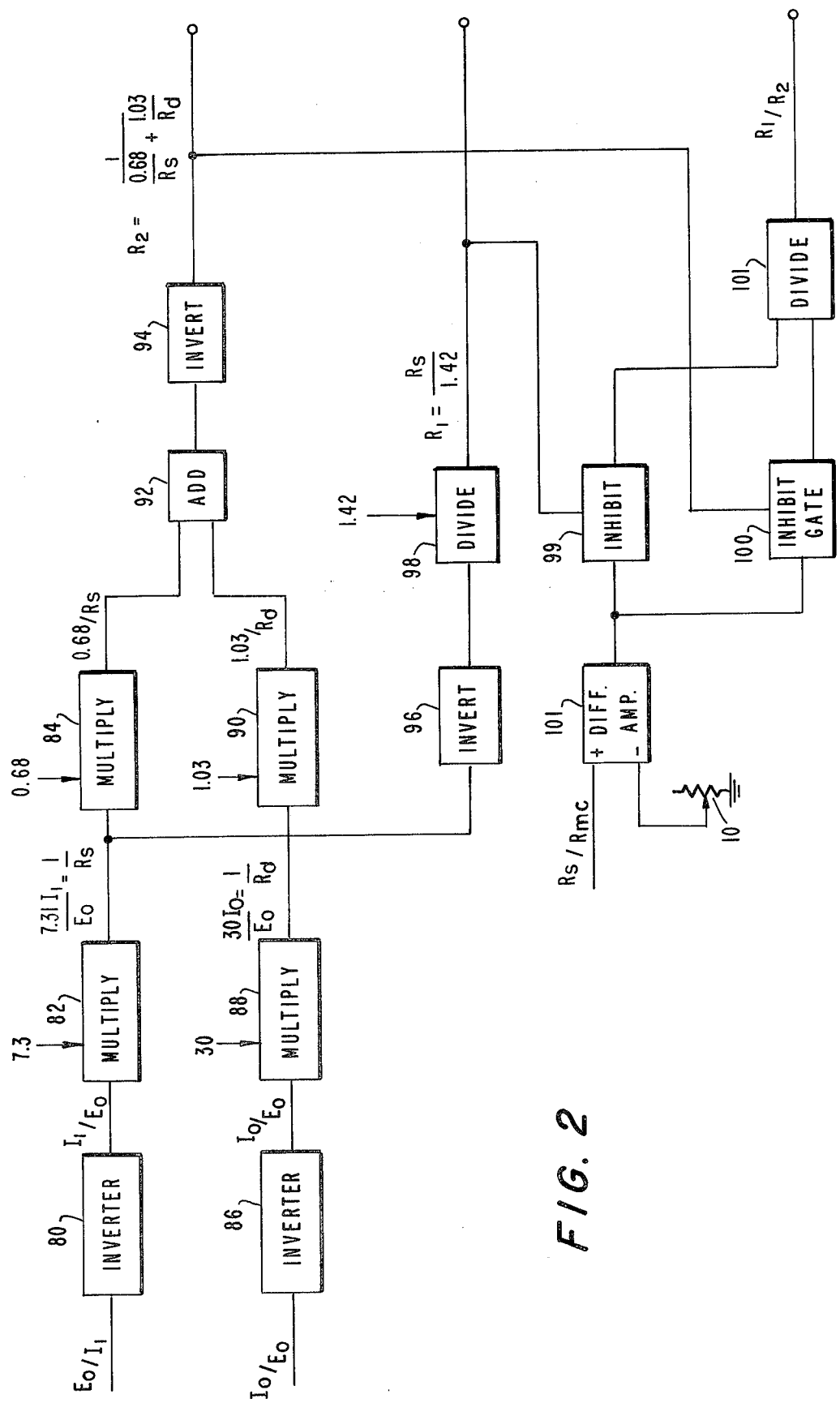
FIG. 2 is a block diagram of the processing circuit shown in FIG. 1 arranged to process the measurements derived from the borehole.

In the processing circuit 62, shown in greater detail in FIG. 2, the resistivity measurement $E_o/I_1$ is first inverted in inverter 80 and then multiplied by 7.3 in multiply circuit 82 to provide a voltage 7.3 $I_1/E_o$ which is equal $1/R_s$; where $R_s$ is the shallow resistivity of the formation. This parameter is then multiplied by 0.68 in multiply circuit 84 to produce an output equal to $0.68/R_s$. Returning to the input of the processing circuit, the resistivity measurement $I_o/E_o$ is applied to inverter 86 wherein it is inverted and the inverted signal is applied to multiply circuit 88 wherein it is multiplied by 30 to produce a signal 30 $I_o/E_o$ which is equal to $1/R_d$; where $R_d$ is the deep resistivity of the formation. The parameter $1/R_d$ is multiplied by 1.03 in multiply circuit 90 to produce the parameter $1.03/R_d$. The outputs from multiply circuit 84 and 90 are applied to addition circuit 92 and then to inverter 94 to produce the following parameter:

$$R_2 = \frac{1}{\frac{0.68}{R_s} + \frac{1.03}{R_d}} \tag{1}$$

Returning now to the output of multiply circuit 82, the parameter $1/R_s$ is applied to inverter 96 and the output of inverter 96 is divided by 1.42 in divide circuit 98 to produce the parameter:

$$R_1 = \frac{R_s}{1.42} \quad (2)$$

Although the parameters $R_1$, $R_2$ are useful by themselves to determine the presence of mud cake and permeable and impermeable formation zones, it has been found, as explained in more detail below, that the ratio of $R_1/R_2$, particularly for values of the ratio of shallow resistivity $R_s$ to mudcake resistivity $R_{mc}$ less than 10, provides an accurate determination of these subsurface earth formation characteristics. Accordingly, the parameters $R_1$ and $R_2$ are also applied to inhibit gates 99, 100 which are controlled by differential amplifier 101. At the input to differential amplifier 101, the ratio $R_s/R_{mc}$ is compared to a voltage representative of the value of that ratio equal to 10, and if the ratio is less than 10, an output is coupled to inhibit gates 99, 100, this output signal activates these gates to apply the $R_1$ and $R_2$ to divide circuit 101 which produces the ratio $R_1/R_2$.

It has been found that when parameters $R_1$ and $R_2$ are considered together that generally when $R_2$ exceeds $R_1$ the pad is opposite a permeable formation wherein mudcake is present, particularly when the ratio of deep resistivity to mudcake resistivity, $R_{mc}$ is equal to or less than 10. Where $R_2$ is less than $R_1$ the formation has no mudcake. In addition, when both $R_2$ and $R_1$ are relatively low, an impermeable formation is known to exist.

Figure 3:
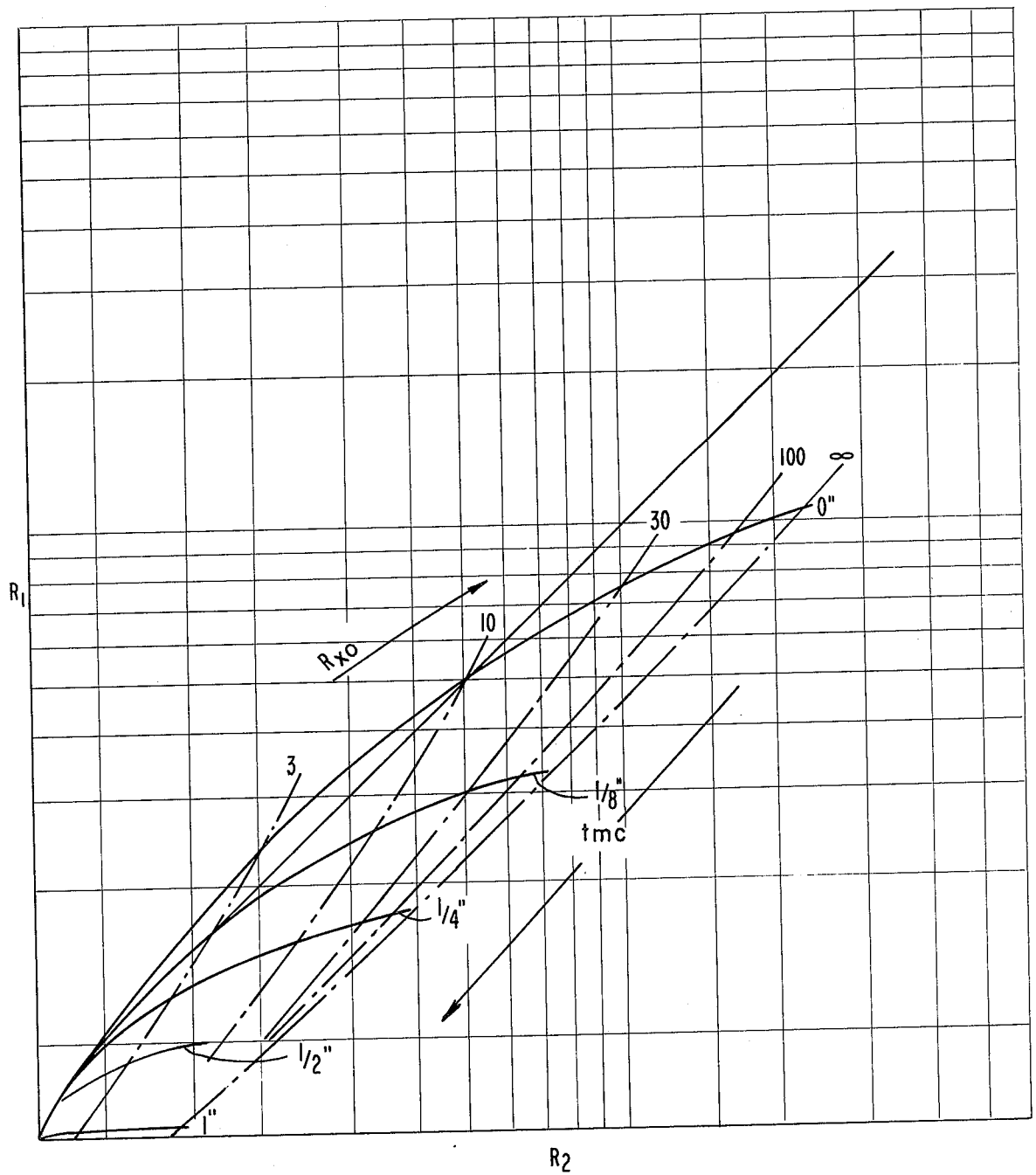
FIG. 3 is a graphical representation of the relationship between the resistivity values determined according to this invention.

This is graphically illustrated in FIG. 3 which is a cross plot, with the value of $R_1/R_{mc}$ plotted along the ordinate and value of $R_2/R_{mc}$ plotted along the abscissa for various values of the ratio of $R_{xo}/R_{mc}$ and mudcake thickness, $t_{mc}$. As seen, the 45° line, representing $R_1$ equal to $R_2$, intersects the zero mudcake thickness line at $R_{xo}/R_{mc}$ equal to 10. Therefore, for ratios of $R_{xo}/R_{mc}$ less than 10, $R_1$ will exceed $R_2$ and provide an indication of the absence of mudcake in the borehole wall.

Figure 4:
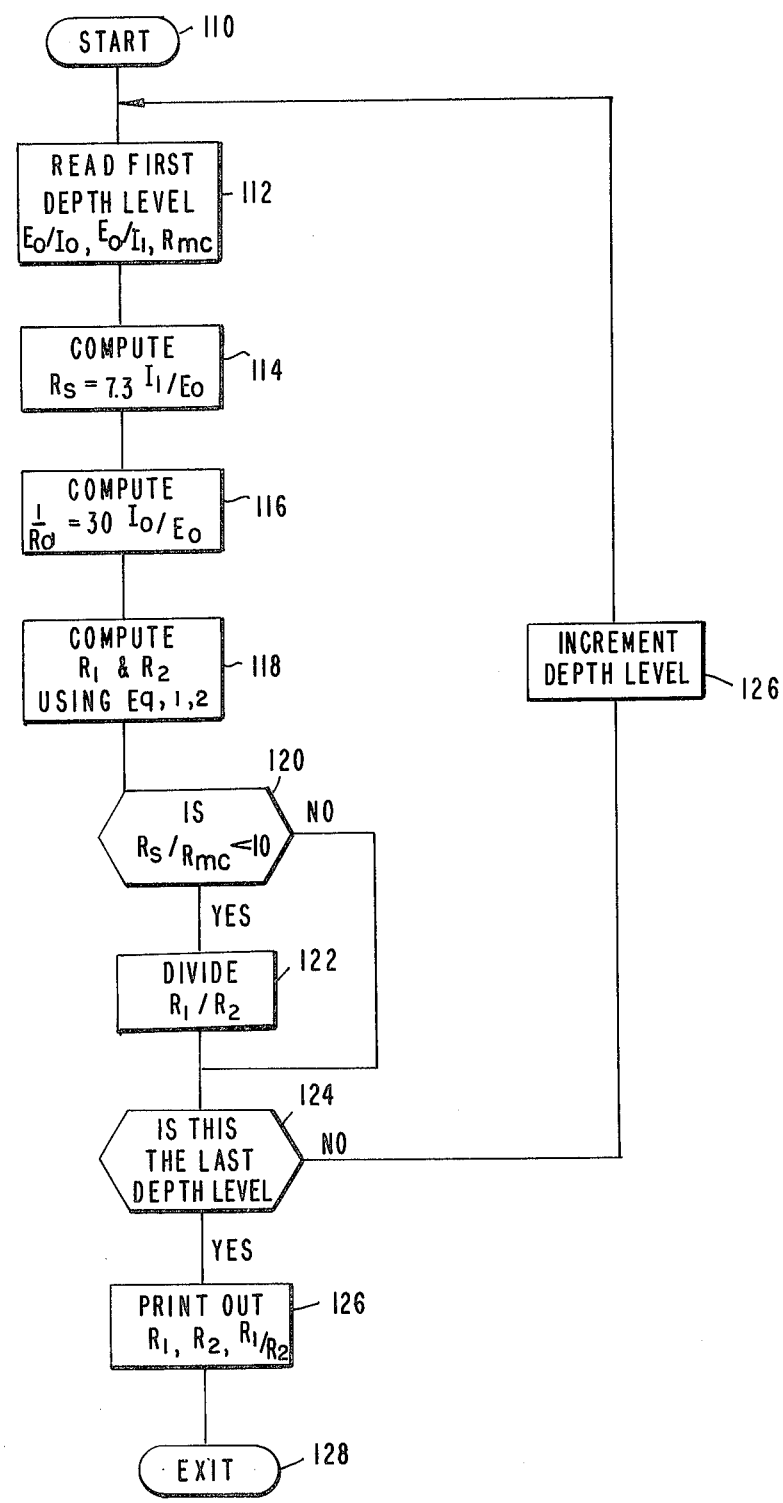
FIG. 4 is a flow diagram representation of a computer program for carrying out the processing of borehole measurements in an alternate manner.

FIG. 4 shows an implementation of this invention utilizing a programmed general purpose computer and shows in flow diagram form, a program for computing the parameters $R_1$ and $R_2$ at each depth level in the formation. The program is entered via block 110 and the first depth level of data $E_o/I_o$ and $E_o/I_1$ is read, block 112. Next, $1/R_s$ is computed, block 114, and then $1/R_d$ is computed, block 116. $R_1$ and $R_2$ are then computed using equations (1) and (2), block 118. Next, it is determined if $R_s/R_m$ is less than 10, decision element 120, and if it is, YES answer, the ratio $R_1/R_2$ is taken, block 122. If the answer from decision element 120 is NO, or after block 122, decision element 124 determines if this is the last depth level, and if it is not, the depth level is incremented, block 126 and the next depth level read. After all the depth levels of data have been read, YES answer from decision element 124, the parameters $R_1$, $R_2$ and $R_1/R_2$ are printed out, block 126 and the program exits block 128.

What has just been described is a method and apparatus by which a spherical focused pad mounted well logging tool and the parameters produced from such a tool have been utilized to overcome one of the problems in the prior use of such a tool, that is the difficulty in distinguishing between permeable and impermeable formations because of the mudcake which forms on the wall of the formation borehole opposite permeable formations. This difficulty has been overcome by providing two new parameters, $R_1$ and $R_2$, which are derived from the borehole measurements in a new and unique manner and when compared will provide an accurate indication of the existance of or non-existance of permeable formations. This method has proven to be particularly useful in those formation parameters in which fresh muds are present and in which the ratio of the deep resistivity to the resistivity of the mud is equal to or less than 10.

What has been described is a method and apparatus for deriving these parameters and specifically shown have been embodiments of processing circuits useful in obtaining these parameters. Thus there is specifically disclosed a special purpose computer for computing the parameters $R_1$ and $R_2$ and also a program for a digital computer which can also be used to compute these parameters. Of course, other circuits can be used and it is within the skill of the art to produce such circuits. These would include such circuits as analog computers and the like.

What I claim is:

1. Apparatus for investigating subsurface earth formations traversed by a borehole comprising:
   a. means for supporting a plurality of electrodes adapted for movement in a borehole, the plurality of electrodes including at least one current emitting electrode adapted to emit current into a borehole;
   b. means for energizing said at least one current emitting electrode so that a main current controlled to flow primarily in the formation surrounding a borehole and an auxiliary current controlled to flow primary in a borehole and the formation immediately surrounding a borehole are emitted;
   c. means for producing first and second signals that are functionally related to said main and auxiliary currents;
   d. means for combining said first and second signals to produce first and second resistivity parameters that are functionally related to said signals and that provide an indication of the presence of permeable zones in the formation, said first resistivity parameter being related to at least said second signal and said second resistivity parameter being related to at least said first and second signals;
   e. means for comparing said first and second resistivity parameters, said comparison means providing a comparison output signal which is indicative of the presence or absence of mudcake on the borehole wall; and
   f. means for providing a signal representative of the resistivity of the mudcake on the borehole wall, means for providing a signal representative of the ratio of shallow resistivity to the mudcake resistivity, and means for coupling said ratio signal to said comparison means for activating said comparison means only when said ratio is less than 10.

2. A method for investigating subsurface earth formations traversed by a borehole comprising:
   a. supporting a plurality of electrodes adapted for movement in a borehole, the plurality of electrodes including at least one current emitting electrode adapted to emit current into a borehole;
   b. energizing said at least one current emitting electrode so that a main current controlled to flow primarily in the formation surrounding a borehole and an auxiliary current controlled to flow primarily in a borehole and the formation immediately surrounding a borehole are emitted;

c. producing first and second signals that are functionally related to said main and auxiliary currents;
d. combining said first and second signals to produce first and second resistivity parameters that are functionally related to said signals and that provide an indication of the presence of permeable zones in the formation, said first resitivity parameter being related to at least said second signal and said second resistivity parameter being related to at least said first and second signals;
e. comparing said first and second resitivity parameters to provide an output signal indicative of the presence or absence of mudcake on the borehole wall; and
f. providing a signal representative of the resistivity of the mudcake on the borehole wall, providing a signal representative of the ratio of the shallow resistivity to the mudcake resistivity, and producing said output signal only when said ratio is less than 10.

* * * * *